(12) United States Patent
Rodgers et al.

(10) Patent No.: US 8,883,906 B2
(45) Date of Patent: Nov. 11, 2014

(54) ELASTOMERIC NANOCOMPOSITES, NANOCOMPOSITE COMPOSITIONS, AND METHODS OF MANUFACTURE

(75) Inventors: Michael B. Rodgers, Seabrook, TX (US); Weiqing Weng, Houston, TX (US); John P. Soisson, Houston, TX (US); Robert N. Webb, Kingwood, TX (US); Sunny Jacob, Seabrook, TX (US); Molly W. Johnston, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 774 days.

(21) Appl. No.: 12/956,877

(22) Filed: Nov. 30, 2010

(65) Prior Publication Data

US 2011/0152422 A1 Jun. 23, 2011

Related U.S. Application Data

(60) Provisional application No. 61/287,622, filed on Dec. 17, 2009.

(51) Int. Cl.
| | |
|---|---|
| *C08K 5/19* | (2006.01) |
| *C08K 9/04* | (2006.01) |
| *C08L 23/20* | (2006.01) |
| *C08J 5/00* | (2006.01) |
| *B82Y 30/00* | (2011.01) |
| *C08L 23/22* | (2006.01) |

(52) U.S. Cl.
CPC .................. *C08J 5/005* (2013.01); *B82Y 30/00* (2013.01); *C08K 5/19* (2013.01); *C08K 2201/011* (2013.01); *C08L 23/22* (2013.01)
USPC ............................. 524/445; 524/258; 524/257

(58) Field of Classification Search
CPC ............. C08K 5/19; C08K 9/04; C08L 23/20

USPC .......................................... 524/445, 258, 257
See application file for complete search history.

(56) References Cited

U.S. PATENT DOCUMENTS

| | | | |
|---|---|---|---|
| 5,576,372 A | 11/1996 | Kresge et al. |
| 5,576,373 A | 11/1996 | Kresge et al. |
| 5,747,560 A | 5/1998 | Christiani et al. |
| 5,807,629 A | 9/1998 | Elspass et al. |
| 6,586,500 B2 | 7/2003 | Bagrodia et al. |
| 7,055,566 B2 | 6/2006 | Ajbani et al. |
| 7,491,764 B2 | 2/2009 | Dias et al. |
| 7,501,460 B1 | 3/2009 | Weng et al. |
| 2004/0122155 A1 | 6/2004 | Pazur |
| 2004/0162379 A1 | 8/2004 | Ajbani et al. |
| 2006/0173115 A1 | 8/2006 | Fudemoto et al. |
| 2007/0015853 A1 | 1/2007 | Weng et al. |
| 2007/0219304 A1 | 9/2007 | Weng et al. |

FOREIGN PATENT DOCUMENTS

| | | | |
|---|---|---|---|
| WO | WO 2010/044776 | * | 10/2008 |
| WO | WO2009/023425 | | 2/2009 |
| WO | WO 2009/023425 | * | 2/2009 |

* cited by examiner

*Primary Examiner* — James J Seidleck
*Assistant Examiner* — Deve E Valdez
(74) *Attorney, Agent, or Firm* — Nancy T Krawczyk

(57) ABSTRACT

A nanocomposite is formed from at least one copolymer and at least one nanofiller. The copolymer is formed of units derived from isoolefins having from 4 to 7 carbon atoms and multiolefins. The nanofiller comprising a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

13 Claims, No Drawings

ELASTOMERIC NANOCOMPOSITES, NANOCOMPOSITE COMPOSITIONS, AND METHODS OF MANUFACTURE

PRIORITY CLAIM

This application claims priority to and the benefit of U.S. Ser. No. 61/287,622, filed Dec. 17, 2009, herein incorporated by reference in its entirety.

FIELD OF THE INVENTION

The present invention is related to elastomeric nanocomposites, compositions comprising the elastomeric compositions, methods of producing nanocomposites, and the use of the nanocomposites in articles. More particularly, the present invention is directed to a halogenated C4 to C7 isoolefin based nanocomposite having improved performance properties and blending characteristics.

BACKGROUND OF THE INVENTION

Rubbery copolymers containing a majority of isobutylene units are well known for their low gas permeability, unique damping properties, and low surface energy; these properties make such copolymers particularly desired in applications such as tire innerliners. In order to have a better compatibility or co-curability with other elastomer components in the end applications, an unsaturated comonomer, and/or a comonomer containing reactive functionality is introduced into the isobutylene rubbery polymer. Previously known comonomers include isoprene and styrene. The copolymer may be partially brominated to give better compatibility.

The tire industry has always been interested in enhancing the barrier properties of tires. One way to improve the barrier properties is to mix them with layered clays to form an elastomeric nanocomposite. The layered clay can adapt to five different states in the base polymer.

The first state is "particle dispersion" wherein the clay particle size is in the order of microns but uniformly dispersed in the base polymer. The terms aggregate and agglomerate have been used to describe this state.

The second state is an "intercalated nanocomposite" wherein polymer chains are inserted into the layered clay structure, this occurring in a crystallographic regular fashion, regardless of the polymer to clay ratio. Intercalated nanocomposites may typically contain several layers of polymer between organoclay plates. An increase in the gallery spacing of the nanoclay, swollen with rubber, from a pristine state of about 0.3 to 0.7 nm up to about 2.0 to 6.0 nm can be considered as creating an intercalated condition.

The third state is a "flocculated nanocomposite." This is conceptually the same as intercalated nanocomposites; however, the individual clay layers are sometimes flocculated or aggregated due to hydroxylated edge to edge interactions of the clay layers.

The fourth state is an "intercalated-flocculated nanocomposite." The clay plates in the nanocomposite can be separated; however, tactoids or agglomerates can form that have a thickness in the range of 100 to 500 nm.

The fifth state is an "exfoliated nanocomposite." In an exfoliated nanocomposite, the individual clay layers are separated within a continuous polymer by an average distance that depends on the clay concentration or loading in the polymer.

However, in producing an elastomeric nanocomposite, the incompatibility between the hydrophobic polyolefin elastomer and the hydrophilic inorganic clays can make it very difficult to achieve a good clay dispersion or exfoliation within the elastomer. Much effort has been make to modify the clay or the elastomer to make the two elements more compatible. It has been previously shown that better interaction between the functionality on the polymer and clay surface would lead to a higher degree of clay dispersion and exfoliation. This, in turn, will yield elastomeric nanocomposites with enhanced barrier properties.

SUMMARY OF THE INVENTION

The present invention is directed to a nanocomposite having improved capabilities for use in articles requiring impermeability features, such as tire innerliners, tire innertubes, tire curing bladders, hoses, medical stoppers, impermeability sheets, and other similar items.

Disclosed herein is a nanocomposite comprising at least one copolymer and at least one nanofiller. The copolymer is formed of units derived from isoolefins having from 4 to 7 carbon atoms and multiolefins. The nanofiller comprising a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

In one aspect of the invention, the copolymer is halogenated with either chlorine or bromine.

In another aspect of the invention, the copolymer forming the nanocomposite has a substantially homogeneous compositional distribution. The copolymer has from about 8 to about 12 wt % of alkylstyrene moieties and from about 1.1 to about 1.5 wt % of a halogen and wherein said copolymer has a ratio of Mw/Mn of less than about 6. In a preferred embodiment, the alkylstyrene is para-methylstyrene and the isoolefin is isobutylene.

In another aspect of the invention, when the copolymer is contains alkylstyrene derived units, the alkylstyrene is functionalized with the halogen, and up to 25 mol % of the alkylstyrene is so functionalized. In a preferred embodiment, from 10 to 25 mol % of the alkylstyrene is functionalized by the halogen.

In another aspect of the invention, the nanocomposite may be blended with a secondary polymer when forming a compound. In such a compound, the compounds contains from 5 to 90 phr of the nanocomposite.

In another aspect of the invention, when forming a compound using the nanocomposite, the nanocomposite is further blended with at least one component selected from the group consisting of fillers, processing oils, and cure packages.

In yet another disclosed invention, the nanocomposite may be blended with a thermoplastic polymer. The thermoplastic polymer may be selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof. In a preferred embodiment, the nanocomposite and the thermoplastic polymer are dynamically vulcanized together under conditions of high shear wherein the nanocomposite is dispersed as fine particles within the thermoplastic polymer.

In another aspect of the invention, the nanofiller is at least one silicate. The silicate is selected from the group consisting of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

Also disclosed is a method of manufacturing a nanocomposite. The nanocomposite comprises at least one copolymer and at least one nanofiller. The method comprising the steps of a) dissolving the copolymer in a solution; b) adding the nanofiller to the solution; and c) recovering the nanocomposite. The copolymer is formed of units derived from isoolefins having from 4 to 7 carbon atoms and a multiolefin. The nanofiller has a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls. The solution is selected from the group consisting of solvent, mixture of solvents, or an emulsion consisting of an aqueous phase and immiscible non-aqueous phase In another aspect of the disclosed method, the nanofiller is added to a second solution prior to adding the nanofiller to the copolymer containing solution.

DETAILED DESCRIPTION OF THE INVENTION

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Definitions

Definitions applicable to the presently described invention are as described below.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent . . . ". Elastomer is a term that may be used interchangeably with the term rubber. Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force". A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Elastomers

Preferred elastomers useful in the practice of this invention include a) copolymers derived from at least one $C_4$ to $C_7$ isoolefin monomer and a multiolefin monomer and b) homopolymers of $C_4$ to $C_7$ isoolefin monomers. Some such copolymers are conventionally referred to as butyl rubbers. For the copolymers, the isoolefin derived content in the copolymer is in a range from 70 to 99.5 wt % by weight of the total monomer derived units in one embodiment, and 85 to 99.5 wt % in another embodiment. The multiolefin derived content in the copolymer is present in the range of mixture from 30 to 0.5 wt % in one embodiment, and from 15 to 0.5 wt % in another embodiment. In yet another embodiment, from 8 to 0.5 wt % of the copolymer is multiolefin derived units.

The $C_4$ to $C_7$ isoolefin may selected from compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in U.S. Pat. No. 5,506,316 and U.S. Pat. No. 5,162,425. Other polymerizable monomers such as styrene and dichlorostyrene are also suitable for homopolymerization or copolymerization in butyl rubbers.

When the isoolefin is isobutylene, the elastomers may be referred to as "an isobutylene based elastomer" and refers to an elastomer or a polymer comprising at least 70 mol % isobutylene derived units. One embodiment of the isobutylene based butyl rubber polymer useful in the invention is obtained by reacting 92 to 99.5 wt % of isobutylene with 0.5 to 8 wt % isoprene, or 95 to 995 wt % isobutylene with 0.5 wt % to 5.0 wt % isoprene in yet another embodiment.

The elastomer in a desirable embodiment of the invention is halogenated. Halogenated butyl rubber is produced by the halogenation of any of the butyl copolymers described above. Halogenation can be carried out by any means, and the invention is not herein limited by the halogenation process. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1.0 to 2.5 wt %.

In accordance with the another embodiment of the present invention, the copolymer is a random copolymer comprising a $C_4$ to $C_7$ isoolefins derived units and alkylstyrene derived units, the copolymer containing at least 85%, more alternatively at least 86.5% by weight of the isoolefin units, about 8 to about 12% by weight alkylstyrene units, and about 1.1 to about 1.5 wt % of a halogen. In one embodiment, the polymer may be a random elastomeric copolymer of a $C_4$ to $C_7$ α-olefin and a methylstyrene containing at about 8 to about 12% by weight methylstyrene, and 1.1 to 1.5 wt % bromine or chlorine. Exemplary materials may be characterized as polymers containing the following monomer units randomly spaced along the polymer chain:

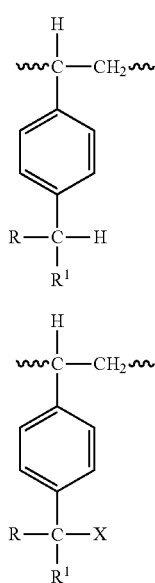

(1)

(2)

wherein R and $R^1$ are independently hydrogen, lower alkyl, such as a $C_1$ to $C_7$ alkyl and primary or secondary alkyl halides and X is a halogen. In one embodiment, R and $R^1$ are each hydrogen.

Up to 25 mol % of the total alkyl substituted styrene [the total of structures (1) and (2)] present in the random polymer structure may be the halogenated alkyl substituted structure (2) above in one embodiment, and in another embodiment from 10 to 25 mol %. In yet another embodiment, the amount of functionalized structure (2) in the random copolymer itself is from about 0.8 to about 1.10 mol %.

In one embodiment, the elastomer comprises random polymers of isobutylene and para-methylstyrene (PMS) containing from about 5 to about 10 mol % para-methylstyrene wherein up to 25 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 4.0, alternatively less than 2.5. The copolymers have an exemplary viscosity average molecular weight in the range of from 400,000 up to 2,000,000 and an exemplary number average molecular weight in the range of from 100,000 to 750,000 as determined by gel permeation chromatography.

The random copolymer discussed above may be prepared via slurry polymerization, typically in a diluent comprising a halogenated hydrocarbon(s) such as a chlorinated hydrocarbon and/or a fluorinated hydrocarbon (see U.S. Pat. No. 7,232,872), using a Lewis acid catalyst and optionally a catalyst initiator, followed by halogenation, preferably bromination, in solution in the presence of the halogen and a radical initiator such as heat and/or light and/or a chemical initiator and, optionally, followed by electrophilic substitution of the halogen with a different functional moiety.

In an embodiment, halogenated poly(isobutylene-co-p-methylstyrene) polymers generally contain from about 0.8 to about 1.1 mol % of halo-methylstyrene groups relative to the total amount of monomer derived units in the copolymer. In another embodiment, the amount of halo-methylstyrene groups is from 0.80 to 1.10 mol %, and from 0.80 to 1.00 mol % in yet another embodiment, and from 0.85 to 1.1 mol % in yet another embodiment, and from 0.85 to 1.0 in yet another embodiment, wherein a desirable range may be any combination of any upper limit with any lower limit. Expressed another way, the copolymers of the present invention contain from about 1.1 to about 1.5 wt % of halogen, based on the weight of the polymer, from 1.1 to 1.5 wt % halogen in another embodiment, and from 1.15 to 1.45 wt % in another embodiment. In a preferred embodiment, the halogen is either bromine or chlorine; in a most preferred embodiment, the halogen is bromine.

In another embodiment, the copolymers are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from about 10 to about 22 mol % based on the total number of para-methylstyrene, and wherein the para-methylstyrene derived units are present from 8 to 12 wt % based on the total weight of the polymer in one embodiment, and from 9 to 10.5 wt % in another embodiment. In another embodiment, the para-(halomethylstyrene) is para-(bromomethylstyrene).

Layered Clay

To form the desired elastomeric nanocomposite, a layered clay is incorporated into the elastomeric polymer. The layered clay is alternatively referred to as a nanoclay due to the size of the clays. Nanoclays have a maximum dimension in the range of from about 0.0001 μm to about 100 μm. The other characteristic of a nanoclay is the high ratio of surface area to volume; this is in distinction to a fine grain carbon black that might have a very small maximum dimension but which has a low ratio of surface area to volume per grain. This high ratio of surface area to volume provides the nanoclay with a sheet-like structure. Such materials are typically agglomerated, resulting in the layered clay.

The layered clay preferably belongs to the general class of clay minerals with expanding crystal lattices commonly referred to as a "smectite" or "smectite-type clay". By way of example, this may include the dioctahedral smectites which consist of montmorillonite, beidellite, and nontronite, and the trioctahedral smectites, which includes saponite, hectorite, and sauconite. Also encompassed are synthetically prepared smectite-clays.

In yet other embodiments, the layered clay may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered clays described above may be modified by intercalation or exfoliation by at least one agent, additive, or surfactant capable of undergoing ion exchange reactions with the anions present at the interlayer surfaces of the layered filler to render the clay more hydrophobic. The agents, additives, or surfactants are selected for their capability of undergoing ion exchange reactions with the anions present at the interlayer surfaces of the layered filler. Suitable compounds are cationic surfactants, preferably quaternary ammonium, in which at least two higher molecular weight group and up to two lower molecular weight groups are linked to the nitrogen.

The inventors have discovered that layered clays containing benzyl functionality provides for unexpected improvement in the separation of the clay layers in the polymer, thereby improving the impermeability of the elastomeric nanocomposite. Thus one of the lower molecular weight groups linked to the quaternary ammonium is a benzyl derived unit. The ammonium may be structurally described as follows:

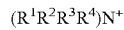

$(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

Suitable quaternary ammoniums include, but are not limited to, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

Nanocomposites can be formed using a variety of processes, such as emulsion blending, solution blending, and melt blending. However, by no means are these processes exhaustive of nanocomposite productions.

Melt Blending

The nanocomposite of the present invention can be formed by a polymer melt blending process. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes

In the emulsion process, an aqueous slurry of inorganic clay is mixed with a polymer dissolved in a solvent (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions are formed by subjecting a mixture of the hydrocarbon, water and surfactant when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amines, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

In the solution process, a nanocomposite is produced by contacting Solution A comprising a hydrocarbon solvent and at least one layered nanofiller or clay with Solution B comprising a solvent and at least one elastomer, and removing the solvents from the contact product of Solution A and Solution B to form a nanocomposite.

The layered nanofiller may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

The amount of nanoclay incorporated in the nanocomposites, regardless of the method used to so incorporate the clay, should be sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber (phr), the nanoclay may be present from 1 to 50 phr in one embodiment, from 5 to 20 phr in another embodiment, from 5 to 10 phr in another embodiment, and 5 phr or 10 phr in yet other embodiments.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In another embodiment, suitable solvents include one or more nitrated alkanes, including $C_2$ to $C_{22}$ nitrated linear, cyclic, or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

In another embodiment, suitable solvents include at least one oxygenate, including $C_1$ to $C_{22}$ alcohols, ketones, ethers, carboxylic acids, esters, and mixtures thereof. Other suitable solvents are further described in WO 2006/085957.

Halogenated versions of all of the above may also be used such as chlorinated hydrocarbons, for example, methyl chloride, methylene chloride, ethyl chloride, propyl chloride, butyl chloride, chloroform, and mixtures thereof.

In fully formulated compounds, when using an emulsion or solution process to mix the copolymer and the nanoclay which yields a preblended nanocomposite elastomer, the amount of based elastomer, the nanocomposite, is expressed in parts per hundred nanocomposite (phn). The nanocomposite will be prepared to have a defined clay loading amount.

Compounding Additives

The elastomeric nanocomposite may be blended with additional components to achieve a fully compounded elastomer. Possible additional components includes conventional fillers, nanofillers, processing aids and oils, and cure packages.

Conventional elastomeric fillers are, for example, calcium carbonate, silica, non-organic clay, talc, titanium dioxide, and carbon black. One or more of the fillers may be used. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the filler is carbon black or modified carbon black, and combinations of any of these. In another embodiment, the filler is a blend of carbon black and silica. Conventional filler amounts for tire treads and sidewalls is reinforcing grade carbon black present at a level of from 10 to 100 phr of the blend, more preferably from 30 to 80 phr in another embodiment, and from 50 to 80 phr in yet another embodiment.

Crosslinking Agents, Curatives, Cure Packages, and Curing Processes

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction.

In certain embodiments of the present invention, the elastomeric compositions and the articles made from those compositions may comprise at least one curative or crosslinking agent to enable the elastomer to undergo a process to cure the elastomeric composition. As used herein, at least one curative package refers to any material or method capable of imparting cured properties to a rubber as commonly understood in the industry. At least one curative package may include any and at least one of the following.

One or more crosslinking agents are preferably used in the elastomeric compositions of the present invention, especially when silica is the primary filler, or is present in combination with another filler. Suitable curing components include sulfur, metal oxides, organometallic compounds, and radical initiators.

Peroxide cure systems or resin cure systems may also be used. However, if the elastomer is being combined with a thermoplastic to form a DVA (where no cross-linking of the thermoplastic is desired), the use of peroxide curative may be avoided if the thermoplastic resin is one such that the presence of peroxide would cause the thermoplastic resin to cross-link.

Sulfur is the most common chemical vulcanizing agent for diene-containing elastomers. It exists as a rhombic eight member ring or in amorphous polymeric forms. A typical sulfur vulcanization system consists of the accelerator to activate the sulfur, an activator, and a retarder to help control the rate of vulcanization. The accelerator serves to control the onset of and rate of vulcanization, and the number and type of sulfur crosslinks that are formed. Activators may also be used in combination with the curative and accelerator. The activate reacts first with the accelerators to form rubber-soluble complexes which then react with the sulfur to form sulfurating agents. General classes of activators include amines, diamines, guanidines, thioureas, thiazoles, thiurams, sulfenamides, sulfenimides, thiocarbamates, xanthates, and the like. Retarders may be used to delay the initial onset of cure in order to allow sufficient time to process the unvulcanized rubber.

Halogen-containing elastomers such as the inventive halogenated poly(isobutylene-co-p-methylstyrene) may be crosslinked by their reaction with metal oxides. The metal oxide is thought to react with halogen groups in the polymer to produce an active intermediate which then reacts further to produce carbon-carbon bonds. Metal halides are liberated as a by-product and can serve as autocatalysts for this reaction. Common curatives include ZnO, CaO, MgO, Al2O3, CrO3, FeO, Fe2O3, and NiO. These metal oxides can be used alone or in conjunction with the corresponding metal fatty acid complex (e.g., the stearate salts of Zn, Ca, Mg, and Al), or with stearic acid and either a sulfur compound or an alkylperoxide compound. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

The mechanism for accelerated vulcanization of elastomers involves complex interactions between the curative, accelerator, activators and polymers. Ideally, all available curative is consumed in the formation of effective crosslinks which join together two polymer chains and enhance the overall strength of the polymer matrix. Numerous accelerators are known in the art and include, but are not limited to, the following: stearic acid, diphenyl guanidine, tetramethylthiuram disulfide, 4,4'-dithiodimorpholine, tetrabutylthiuram disulfide, benzothiazyl disulfide, hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiarybutyl-2-benzothiazole sulfenamide, and N-oxydiethylene thiocarbamyl-N-oxydiethylene sulfonamide, zinc 2-ethyl hexanoate, and thioureas.

Elastomeric compositions typically contain other components and additives customarily used in rubber mixes, such as effective amounts of other nondiscolored and nondiscoloring processing aids, processing oils, pigments, antioxidants, and/or antiozonants.

Secondary Elastomers

In one embodiment, the elastomeric nanocomposite as discussed above may be the sole elastomeric component of a compound; thereby taking full advantage of the above noted benefits. Alternatively in other embodiments, the inventive copolymer may be blended with a different/secondary elastomeric polymer to obtain a compound having other desired properties or characteristics.

Examples of other elastomeric polymers, or general purpose rubbers, include natural rubbers (NR), polybutadiene rubber (BR), polyisoprene rubber (IR), poly(styrene-co-butadiene) rubber (SBR), poly(isoprene-co-butadiene) rubber (IBR), styrene-isoprene-butadiene rubber (SIBR), ethylene-propylene rubber (EPM), ethylene-propylene-diene rubber (EPDM), and mixtures thereof.

When blended in a compound, the presently disclosed elastomer, either individually or as a blend of different elastomers (i.e., reactor blends, physical blends such as by melt mixing), may be present in the composition from 10 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Such secondary rubbers may be present in the final composition in amounts ranging from 5 to 90 phr. To obtain a greater impermeability, the use of polymers having lesser permeability characteristics will be limited to minor amounts, i.e., less than 50 phr, in the elastomeric blend.

INDUSTRIAL APPLICABILITY

The elastomeric nanocomposite formed in accordance with the present invention preferably has an oxygen transmission rate of 125 mm·cc/[m2·day] at 40° C. or lower as measured on cured nanocomposite compositions or articles as described herein. Alternatively, the oxygen transmission rate 120 mm·cc/[m2·day] at 40° C. or lower, 110 mm·cc/[m2·day] at 40° C. or lower, 100 mm·cc/[m2·day] at 40° C. or lower, 90 mm·cc/[m2·day] at 40° C. or lower, or 80 mm·cc/[m2·day] at 40° C. or lower, as measured on cured nanocomposite compounds as described herein.

Permeation of a gas or permeability though a membrane such as tire innerliner consists of three distinct processes. First, the gas molecules must dissolve on one side of the membrane, then diffuse across the membrane or liner to the opposite side of lower gas concentration, the rate being dependent on the size of the diffusion gradient, and then evaporate or disperse in the adjacent tire component or other medium. The size of oxygen and nitrogen molecules are 2.9 and 3.1 Angstroms respectively; the activation energy of diffusion is reported to be 49.8 and 50.6 KJ/mol respectively for oxygen and nitrogen. These values clearly suggest that oxygen diffuses more readily than nitrogen, and permeability values for oxygen will be higher than for nitrogen.

Oxygen permeability was measured using a MOCON OxTran Model 2/61. The units of measure are cc-mm/m²-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\sigma$) in measuring air permeability is ±0.245 ($\times 10^8$) units.

EXAMPLES

Examples were made to determine the properties of nanocomposites prepared in accordance with the disclosed invention.

Nanocomposite 1: 10.2 g of a layered clay having a methyl benzyl dialkyl ammonium surfactant was added to 150 g of a brominated isobutylene-co-p-methylstyrene copolymer (BIMS) cement (20.4 wt % solution in hexanes). The copolymer has 10 wt % of para-methylsytrene (PMS) and 0.85 mol % brominated para-methylstyrene (BrPMS). The clay slurry in polymer cement was mixed for 10 minutes at ambient temperature and another 340 g of copolymer cement (20.4 wt % solution in hexane) was added. The mixing was kept at ambient temperature for 50 minutes. The product was precipitated by adding 2,000 ml of isopropyl alcohol to the polymer cement. The product was obtained by steam stripping to remove the solvents and dried in a vacuum oven at 80° C. for 16 hours.

Nanocomposite 2: 10.2 g of a layered clay having a methyl benzyl dialkyl ammonium surfactant was added to 490 g of BIMS cement (copolymer: 10 wt % PMS and 0.85 mol % BrPMS/20.4 wt % solution in hexanes). The clay slurry in polymer cement was mixed for 60 minutes at ambient temperature. The product was precipitated by adding 2,000 ml of isopropyl alcohol to the polymer cement. The product was obtained by steam stripping to remove the solvents and dried in a vacuum oven at 80° C. for 16 hours.

Nanocomposite 3: 9.3 g of a layered clay having a methyl benzyl dialkyl ammonium surfactant was added to 150 ml of hexanes. The clay slurry was mixed for 10 minutes at ambient temperature and then added to 490 g of BIMS cement (copolymer: 10 wt % PMS and 0.85 mol % BrPMS/20.4 wt % solution in hexanes) and 500 ml of isohexane. Mixing was done at ambient temperature for 50 minutes. The product was precipitated by adding 2,000 ml of isopropyl alcohol to the polymer cement. The product was obtained by steam stripping to remove the solvents and dried in a vacuum oven at 80° C. for 16 hours.

Nanocomposite 4: A 378.5 liter glass-lined reactor was charged with 149.2 kgs of BIMS cement (copolymer: 10 wt % PMS and 0.85 mol % BrPMS/21 wt % solution in hexane) and 90.8 liters of iso-hexane. After 3325 g of a layered clay having a methyl benzyl dialkyl ammonium surfactant was added, the reactor was charged with 10 psig of nitrogen and heated to 50° C. The reactor contents were circulated and mixed at 50° C. for 3.5 hours with a reactor content turn-over time of about 7 minutes. After 3 hours, the reactor was cooled down to ambient temperature. The polymer cement was transferred to a steam stripper and solvent was removed by steam stripping. The resulting product was dried using a dewatering expeller and a drying extruder.

Nanocomposite 5: A 2839 liter glass-lined reactor was charged with 833 kgs of BIMS cement (copolymer: 10 wt % PMS and 0.85 mol % BrPMS/21 wt % solution in hexane) and 253.6 liters of iso-hexane. A 378.5 liter glass lined reactor was charged with 18,915 g of a layered clay having a methyl benzyl dialkyl ammonium surfactant and 253.6 liters of iso-hexane. The 378.5 liter reactor was charged with 10 psig of nitrogen and heated to 50° C. The reactor contents were circulated and mixed at 50° C. for 5 hours with a reactor content turn-over time of about 7 minutes. After 5 hours, the clay slurry was pumped into the 750 gallon reactor. The reactor contents were circulated and pumped at ambient temperature for 12 hours. After the 12 hours, the polymer cement was transferred to a steam stripper and solvent was removed by steam stripping. The resulting product was dried using a dewatering expeller and a drying extruder.

Comparative Nanocomposite 6: 9.8 g of organoclay having a dimethyl benzyl alkyl ammonium surfactant (Cloisite 10A™ from Southern Clay Products, Gonzales, Tex. USA) was added to 200 grams of BIMS cement (copolymer: 10 wt % PMS and 0.85 mol % BrPMS/20.4 wt % solution in hexane). The clay slurry in polymer cement was mixed for 10 minutes at ambient temperature using a high shear mixer, and another 290 g of BIMS cement (20.4 wt % solution in hexane) was added. The mixing was kept at ambient temperature for 50 minutes. The product was precipitated by adding 2000 ml of isopropyl alcohol to the cement mixture. The product was obtained by steam stripping to remove the solvent and dried in a vacuum oven at 80° C. for 16 hours.

Comparative Nanocomposite 7: 9.7 g of organoclay having a dimethyl ditallow ammonium surfactant (Cloisite 20A™ from Southern Clay Products, Gonzales, Tex. USA) was added to 200 grams of BIMS cement (copolymer: 10 wt % PMS and 0.85 mol % BrPMS/20.4 wt % solution in hexane). The clay slurry in polymer cement was mixed for 10 minutes at ambient temperature using a high shear mixer, and another 290 g of BIMS cement (20.4 wt % solution in hexane) was added. The mixing was kept at ambient temperature for 50 minutes. The product was precipitated by adding 2000 ml of isopropyl alcohol to the cement mixture. The product was obtained by steam stripping to remove the solvent and dried in a vacuum oven at 80° C. for 16 hours.

Comparative Nanocomposite 8: 100 g of BIMS (copolymer: 10 wt % PMS and 0.85 mol % BrPMS) was dissolved in 1200 ml of cyclohexene in a 2 liter reactor. The polymer cement was heated to 75° C. 3.0 g of bis(2-hydroxylethyl) cocoalkyl amine and 5.0 grams of organoclay having a dimethyl ditallow ammonium surfactant (Cloisite 6A™ from Southern Clay Products, Gonzales, Tex. USA) were mixed with cyclohexene and added to the reactor. The reaction was kept at 75° C. for 3 hours. The product was precipitated by adding 2000 ml of isopropyl alcohol to the polymer cement. The resulting product was dried in a vacuum oven at 60° C. for 24 hours.

Comparative Nanocomposite 9: A 2 liter reactor was charged with 1200 ml toluene and 12 g of organoclay having a dimethyl ditallow ammonium surfactant (Cloisite 20A™ from Southern Clay Products, Gonzales, Tex. USA). When the clay was well dispersed in the solvent, 150 g of BIMS (copolymer: 10 wt % PMS and 0.85 mol % BrPMS) was added to the reactor with stirring. After the polymer was dissolved, the cement was heated to 70° C. and kept at 70° C. for 2 hours. The product was collected in a large pan and the solvent was evaporated under a hood. The resulting product was dried in a vacuum oven at 70° C. for 24 hours.

Comparative Nanocomposite 10: A 378.5 liter glass-lined reactor was charged with 15.87 kg of BIMS (copolymer: 10 wt % PMS and 0.85 mol % BrPMS) and 127 kg of cyclohexene. The reactor contents were stirred at ambient temperature for 24 hours until the polymer was dissolved. 160 grams of bis(2-hydroxylethyl) cocoalkyl amine and 635 g of organoclay (Cloisite 6A™ from Southern Clay Products, Gonzales, Tex. USA) having a dimethyl ditallow ammonium surfactant were mixed with 2000 ml cyclohexene and then added to the reactor. The temperature was raised to 75° C. and the reaction was kept at 75° C. for 2 hours. After 2 hours, the reactor was cooled down to ambient temperature. The polymer cement was transferred to a steam stripper and solvent was removed by steam stripping. The resulting polymer was dried using a dewatering expeller and a drying extruder.

Compound samples were prepared using the above inventive nanocomposites and comparative nanocomposite. The following formulation was used for each Sample: 106 parts per hundred rubber (phr) of the nanocomposite, 60.0 phr N660 carbon black, 1.0 phr stearic acid, 1.0 phr zinc oxide, and 1.0 phr MBTS curative. The use of 106 phr nanocomposite provides for 100 phr of elastomeric copolymer and 6 phr clay. The Samples were prepared by mixing 36 grams of the nanocomposite with 20 g carbon black in a Brabender™ mixer at 135° C. at 60 rpm for 7 minutes. The curatives were added, 33 g stearic acid, 0.33 g zinc oxide, and 0.33 g MBTS, and the mixer was operated at 45° C. and 40 rpm for 4 minutes. The nanocompound Samples were cured at 170° C. Specimens were cut for Mocon permeability measurements. The permeation rate was measured on a Mocon OX TRAN 2/61 instrument at 40° C. The permeation rates are provided in Table 1 below.

TABLE 1

| Sample ID | Permeation rate at 40° C. (bu*mm/m$^2$-day, 40° C.) |
|---|---|
| Example 1 | 81.76 |
| Example 2 | 84.32 |
| Example 3 | 84.32 |
| Example 4 | 86.80 |
| Example 5 | 81.58 |
| Comparative Example 6 | 116.80 |
| Comparative Example 7 | 95.73 |
| Comparative Example 8 | 122.75 |
| Comparative Example 9 | 109.10 |
| Comparative Example 10 | 159.15 |

As evident from the data above, the permeation rates for the inventive samples are significantly lower for the comparative examples. While not wishing to be bound by any one theory, it is believed that the particular combination of one benzyl derived unit and at least two long chain derived units on the quaternary amine provides for enhanced dispersion in the hydrocarbon solvent. The enhanced dispersion leads to greater exfoliation and dispersion of the clay in the dissolved copolymer solution.

To determine the properties of the nanocomposite when used in a barrier application, the nanocomposites of Example 4 were further evaluated as tire innerliner compounds and compared to bromobutyl based inner liner compounds, BIMS based inner liner compounds, and an innerliner using a different BIMS nanocomposite. The formulations and key properties are provided in Table 2 below.

TABLE 2

| Compound | 1 | 2 | 3 | 4 | C1 | C2 | C3 | C4 |
|---|---|---|---|---|---|---|---|---|
| Nanocomposite Example 4 | 110.00 | 110.00 | 110.00 | 110.00 | | | | |
| Bromobutyl Grade 2222[1] | | | | | 100.00 | | | |
| Bromobutyl Grade 2255[2] | | | | | | 100.00 | | |
| BIMS copolymer[3] | | | | | | | 100.00 | 100.00 |
| Cloisite 20A | | | | | | | | 10.00 |
| Carbon Black | 55.00 | 60.00 | 50.00 | 60.00 | 60.00 | 60.00 | 60.00 | 60.00 |
| Napthanic oil | 2.00 | 2.00 | 1.00 | 3.50 | 8.00 | 8.00 | 8.00 | 3.50 |
| Resin[4] | 3.00 | 10.00 | 5.00 | 7.00 | 7.00 | 7.00 | 7.00 | 7.00 |
| Phenolic tackifier[5] | 3.00 | 2.00 | 2.00 | 4.00 | 4.00 | 4.00 | 4.00 | 4.00 |
| Stearic acid | 1.00 | 1.00 | 1.00 | 1.00 | 1.00 | 1.00 | 1.00 | 1.00 |
| Zinc oxide | 1.00 | 1.00 | 1.00 | 1.00 | 1.00 | 1.00 | 1.00 | 1.00 |
| MBTS[6] | 1.25 | 1.25 | 1.25 | 1.25 | 1.25 | 1.25 | 1.25 | 1.25 |
| Sulfur | 0.50 | 0.50 | 0.50 | 0.50 | 0.50 | 0.50 | 0.50 | 0.50 |
| Total phr | 176.75 | 187.75 | 171.75 | 189.25 | 182.75 | 182.75 | 182.75 | 188.25 |
| Mooney Viscosity (1 + 4 @ 100° C.) | 95.50 | 96.40 | 94.10 | 94.60 | 58.0 | 66.70 | 57.20 | 61.80 |
| Mooney Scorch (t5, min) | 6.58 | 7.03 | 7.22 | 4.47 | 28.73 | 23.97 | 32.33 | 6.98 |
| Shear Stress (KPa, at shear rate of 100) | 688.70 | 646.92 | 647.13 | 1093.42 | 277.08 | 295.42 | 270.32 | 329.78 |
| Tensile Strength, MPa, ASTM D412 | 11.18 | 10.21 | 10.86 | 12.85 | 8.81 | 10.10 | 8.55 | 9.76 |
| 300% Modulus, MPa, ASTM D412 | 7.46 | 7.12 | 6.99 | 7.00 | 2.94 | 3.81 | 4.72 | 5.65 |

TABLE 2-continued

| Compound | 1 | 2 | 3 | 4 | C1 | C2 | C3 | C4 |
|---|---|---|---|---|---|---|---|---|
| Die B Tear Strength, N/mm | 1.63 | 2.39 | 2.59 | 6.19 | 13.48 | 12.52 | 6.37 | 1.30 |
| Shore Hardness A, ASTM D2240 | 62.0 | 63.0 | 62.0 | 59.0 | 45.0 | 47.0 | 54.0 | 61.0 |
| Average Permeation Rate, bu*mm/m$^2$ · day | 102.17 | 104.28 | 103.16 | 113.25 | 199.16 | 195.96 | 169.62 | 127.37 |

[1] low Mooney viscosity brominated butyl rubber; source: ExxonMobil Chemical Co., Houston, Tx
[2] high Mooney viscosity brominated butyl rubber source: ExxonMobil Chemical Co., Houston Tx
[3] 10 wt % PMS and 0.85 mol % BrPMS
[4] STRUKTOL ™ 40 MS; aliphatic-aromatic-naphthenic resin; source: Struktol Co. of America, Stow, OH
[5] SP-1068; available from SI Group, Schenectady, NY
[6] 2-mercaptobenzothiazole disulfide; available from R. T. Vanderbilt (Norwalk, CT) or Elastochem (Chardon, OH)

The average permeation rate reported in Table 2 is the average between several permeation rates measured for each Compound.

The composition prepared with nanocomposite Example 4 show much lower permeation rates than the comparative compositions—including that of C4 which has a comparable amount of nanoclay therein (10 phr) and has a BISM base polymer. This further evidences that the particular clay having both the benzyl and the long substituents provides for enhanced reduced permeability of the nanocomposite composition.

The invention, accordingly, provides the following embodiments:

A. A nanocomposite comprising at least one copolymer and at least one nanofiller:

the copolymer comprising units derived from isoolefins having from 4 to 7 carbon atoms and multiolefins; and the nanofiller comprising a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

B. The nanocomposite of embodiment A, wherein the copolymer is halogenated with either chlorine or bromine.

C. The nanocomposite of embodiment A or B, wherein the copolymer has a substantially homogeneous compositional distribution and comprises from about 8 to about 12 wt % of alkylstyrene moieties and from about 1.1 to about 1.5 wt % of a halogen and wherein said copolymer has a ratio of Mw/Mn of less than about 6.

D. The nanocomposite of embodiment C, wherein the alkylstyrene is para-methylstyrene and the isoolefin comprises isobutylene.

E. The nanocomposite of embodiment C or D, wherein the alkylstyrene is functionalized with the halogen, and up to 25 mol % of the alkylstyrene is so functionalized.

F. The nanocomposite of embodiment E, wherein from 10 to 25 mol % of the alkylstyrene is functionalized by the halogen.

G. The nanocomposite of any of embodiments A to F, wherein the nanocomposite is blended with a secondary polymer to form a compound, the compound containing from 5 to 90 phr of the nanocomposite.

H. The nanocomposite of embodiment G, wherein the secondary polymer is selected from the group consisting of natural rubbers, polybutadiene rubber, polyisoprene rubber, poly(styrene-co-butadiene) rubber, poly(isoprene-co-butadiene) rubber, styrene-isoprene-butadiene rubber, ethylene-propylene rubber, ethylene-propylene-diene rubber, and mixtures thereof.

I. The nanocomposite of any of embodiments A to H, wherein the nanocomposite is blended with at least one component selected from the group consisting of fillers, processing oils, and cure packages.

J. The nanocomposite of any of embodiments A to I, wherein the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof.

K. The nanocomposite of embodiment J, wherein the nanocomposite and the thermoplastic polymer are dynamically vulcanized together under conditions of high shear wherein the nanocomposite is dispersed as fine particles within the thermoplastic polymer.

L. The nanocomposite of any of embodiments A to K, wherein the nanofiller is at least one silicate and is selected from the group consisting of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

M. The nanocomposite of any of embodiments A to L, wherein the quaternary ammonium surfactant is selected from the group consisting of benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

N. The method of manufacturing a nanocomposite, the nanocomposite comprising at least one copolymer and at least one nanofiller, the method comprising:

a) dissolving the copolymer in a solution, the copolymer comprising units derived from isoolefins having from 4 to 7 carbon atoms and a multiolefin, wherein the solution is selected from the group consisting of solvent, mixture of solvents, or an emulsion consisting of an aqueous phase and immiscible non-aqueous phase;

b) adding the nanofiller to a solution, the nanofiller comprising a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls; and c) recovering the nanocomposite from the solution.

O. The method of embodiment N, wherein the nanofiller is added to a second solution prior to adding the nanofiller to the copolymer containing solution, wherein the second solution is selected from the group consisting of solvent, mixture of solvents, or an emulsion consisting of an aqueous phase and immiscible non-aqueous phase.

Compositions comprising the nanocomposites of the invention may be extruded, compression molded, blow molded, injection molded, and laminated into various shaped articles including fibers, films, laminates, layers, industrial parts such as automotive parts, appliance housings, consumer products, packaging, and the like.

The nanocomposite compositions as described above may be used in the manufacture of air membranes such as innerliners, innertubes sidewalls, treads, bladders, and the like used in the production of tires. Methods and equipment used to manufacture the innerliners and tires are well known in the art. The invention is not limited to any particular method of manufacture for articles such as innerliners or tires. In particular, the nanocomposites are useful in compositions used in articles for a variety of tire applications such as truck tires, bus tires, automobile tires, motorcycle tires, off-road tires, aircraft tires, and the like.

In another application, elastomeric compositions comprising the nanocomposite may be employed in air cushions, pneumatic springs, air bellows, hoses, accumulator bags, and belts such as conveyor belts or automotive belts. They are useful in molded rubber parts and find wide applications in automobile suspension bumpers, auto exhaust hangers, and body mounts.

Additionally, elastomeric compositions comprising the nanocomposite may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

What is claimed is:

1. A nanocomposite comprising at least one halogenated copolymer and at least one nanofiller:
   the halogenated copolymer comprising units derived from isoolefins having from 4 to 7 carbon atoms and multiolefins; and
   the nanofiller comprising a surfactant wherein the surfactant has the structure of $(R^1R^2R^3R^4)N^+$ wherein $R^1$ is benzyl derived unit, which may or may not be substituted, wherein $R^2$ is selected from $C_1$ to $C_{26}$ alkyls, $C_2$ to $C_{26}$ alkenes, and $C_3$ to $C_{26}$ aryls, and wherein $R^3$ and $R^4$ are the same or different and are independently selected from $C_9$ to $C_{26}$ alkyls, $C_9$ to $C_{26}$ alkenes, and $C_9$ to $C_{26}$ aryls.

2. The nanocomposite of claim 1, wherein the copolymer is halogenated with either chlorine or bromine.

3. The nanocomposite of claim 1, wherein the halogenated copolymer has a substantially homogeneous compositional distribution and comprises from about 8 to about 12 wt % of alkylstyrene moieties and from about 1.1 to about 1.5 wt % of a halogen and wherein said copolymer has a ratio of Mw/Mn of less than about 6.

4. The nanocomposite of claim 3, wherein the alkylstyrene is para-methylstyrene and the isoolefin comprises isobutylene.

5. The nanocomposite of claim 3, wherein the alkylstyrene is functionalized with the halogen, and up to 25 mol % of the alkylstyrene is so functionalized.

6. The nanocomposite of claim 5, wherein from 10 to 25 mol % of the alkylstyrene is functionalized by the halogen.

7. The nanocomposite of claim 1, wherein the nanocomposite is blended with a secondary polymer to form a compound, the compound containing from 5 to 90 phr of the nanocomposite.

8. The nanocomposite of claim 7, wherein the secondary polymer is selected from the group consisting of natural rubbers, polybutadiene rubber, polyisoprene rubber, poly(styrene-co-butadiene) rubber, poly(isoprene-co-butadiene) rubber, styrene-isoprene-butadiene rubber, ethylene-propylene rubber, ethylene-propylene-diene rubber, and mixtures thereof.

9. The nanocomposite of claim 1, wherein the nanocomposite is blended with at least one component selected from the group consisting of fillers, processing oils, and cure packages.

10. The nanocomposite of claim 1, wherein the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof.

11. The nanocomposite of claim 10, wherein the nanocomposite and the thermoplastic polymer are dynamically vulcanized together under conditions of high shear wherein the nanocomposite is dispersed as fine particles within the thermoplastic polymer.

12. The nanocomposite of claim 1, wherein the nanofiller is at least one silicate and is selected from the group consisting of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

13. The nanocomposite of claim 1, wherein the quaternary ammonium surfactant is selected from the group consisting of benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

* * * * *